(12) United States Patent
Wheeler

(10) Patent No.: US 6,626,074 B1
(45) Date of Patent: Sep. 30, 2003

(54) DOWN HOLE PIPE AND CASING CUTTER

(76) Inventor: Theodore D. Wheeler, 701 Yampa Ave., Craig, CO (US) 81625

( * ) Notice: Subject to any disclaimer, the term of this patent is extended or adjusted under 35 U.S.C. 154(b) by 0 days.

(21) Appl. No.: 10/146,242

(22) Filed: May 14, 2002

(65) Prior Publication Data (65)

(51) Int. Cl.⁷ ............................. B23B 5/04; B23B 5/14; E21B 29/00; E21B 33/13
(52) U.S. Cl. ........................... 82/113; 82/82; 166/55.6; 166/117
(58) Field of Search ................ 82/113, 82; 409/175, 409/178, 179; 166/55.6, 98, 177; 83/54, 187; 30/103, 104, 105, 106, 107, 108; 175/75, 78, 113, 170

(56) References Cited

U.S. PATENT DOCUMENTS

| | | | |
|---|---|---|---|
| 1,068,991 A | 7/1913 | Dunkerley et al. | |
| 1,088,135 A * | 2/1914 | Fagan | 166/55.7 |
| 2,572,611 A * | 10/1951 | Glore et al. | 30/104 |
| 2,942,092 A | 6/1960 | Cammann | 219/69 |
| 3,783,721 A | 1/1974 | Miller | 82/82 |
| 3,939,561 A * | 2/1976 | Nichols | 30/107 |
| 4,307,512 A * | 12/1981 | Phillips | 30/94 |
| 4,369,573 A | 1/1983 | Vitale | 30/105 |
| 4,476,368 A | 10/1984 | Cammann et al. | 219/69 |
| 4,576,070 A | 3/1986 | Fitzgerald | 82/82 |
| 4,809,775 A | 3/1989 | Fortin | 166/55.7 |
| 4,932,125 A | 6/1990 | Poveromo | 30/103 |
| 5,810,079 A | 9/1998 | Lynde et al. | 166/55.6 |
| 5,815,926 A * | 10/1998 | Ekern | 30/103 |
| 6,125,929 A | 10/2000 | Davis et al. | 166/55.7 |

* cited by examiner

Primary Examiner—A. L. Wellington
Assistant Examiner—Brian D. Walsh
(74) Attorney, Agent, or Firm—Sheridan Ross P.C.

(57) ABSTRACT

A down hole pipe cutter is provided to cut a section of pipe from the pipe's interior. The device includes a lower guide plate, an upper guide plate, a connector rod interconnecting the lower guide plate to the upper guide plate, and an eccentrically mounted blade drive assembly. The eccentrically mounted blade drive assembly includes an outer tube and an inner drive shaft that are moveably interconnected to both the lower guide plate and the upper guide plate. The inner drive shaft has a distal end extending through the lower guide plate with a blade attached thereto. The proximal end of the drive shaft extends above the upper guide plate for attachment to a power source, such as a hand drill. The blade drive assembly is rotatable between a first retracted position and a second extended cutting position.

46 Claims, 5 Drawing Sheets

Fig_3

DOWN HOLE PIPE AND CASING CUTTER

FIELD OF THE INVENTION

The present invention relates to a cutting tool, and more particularly, to a device that can be used to cut an installed portion of well pipe or well casing from the inside of the pipe or casing.

BACKGROUND OF THE INVENTION

Recently promulgated regulations pertaining to groundwater well construction have placed a burden on well drillers to install outer metal pipe casings at the upper portion of a groundwater well. The casing may extend some depth, and depending upon site conditions, the casing may extend through upper soil deposits and into a non-water bearing soil or rock formation. Drilling is subsequently performed through the center of the outer metal casing, and typically includes the installation of an inner pipe that extends into a deeper water bearing formation.

For a number reasons, the well driller may desire to cut either the pipe or casing after it has been installed in a borehole. For example, the well driller may be tasked with installing a pitless adapter below the frost depth, thereby allowing the well to convey water to a horizontal water supply pipe that is also installed below frost depth.

Down hole pipe cutters of the prior art are typically complicated and offer the operator limited control over the device. For example, U.S. Pat. No. 4,369,573 to Vitale discloses a pipe cutter for cutting the wall of a pipe from within the bore of a pipe. The blade is mounted on an eccentric axis at the base of a drive body. However, the device disclosed in Vitale utilizes a "gripper" portion that acts in conjunction with the torque of the spinning blade to rotate the blade within the pipe, thereby causing the rotating blade to traverse the circumference of the pipe. This type of circumferential rotation mechanism limits operator control of the device while it is cutting the inner circumference of the pipe or casing.

U.S. Pat. No. 1,068,991 to Dunkerley et al. discloses a flue cutter that utilizes a knife that is flung out against the flue when the tool is rotated rapidly. The Dunkerley device does not provide an eccentrically mounted blade that is urged toward the pipe or casing wall in a controlled manner. Furthermore, the Dunkerley device fails to provide means for supporting the cut section of pipe while the cut section is being extracted from the borehole.

U.S. Pat. No. 3,783,721 to Miller discloses a tube cutter that is placed inside a tube and rotated using a hand drill to cut the tube. The Miller device is not suited for down hole pipe cutting because the depth of use is limited by the diameter of the pipe being cut. Furthermore, it is possible to over cut the inner pipe and potentially cut through the outer pipe wall, if present.

U.S. Pat. No. 4,576,070 to Fitzgerald discloses a pipe cutter powered by a hand held tool that is used to cut the pipe from the pipe's interior. Like the Miller reference, this reference is not suited for down hole cutting because the depth of use is limited by the diameter of the pipe being cut. More specifically, the cutting element must by maintained in a straight line orientation with the hand held tool thus limiting the ability of a user to traverse the cutting unit around the circumference of the pipe in a controlled manner.

U.S. Pat. No. 4,809,775 to Fortin discloses a down-hole pipe recovery cutting tool using compressed air to power a motor located near the cutting blade. The Fortin device uses a centralizer that is thrown off into the well after the cutting toot is activated. This could detrimentally impact the condition of the well by blocking the deeper pipe, therefore preventing future installation of a submersible pump. In addition, even if the centralizer happens to fall to the bottom of the well, the centralizer will nonetheless prevent access to the bottom of the well screen.

U.S. Pat. No. 4,932,125 to Poveromo discloses a device that can be used to cut a pipe from its interior. Poveromo uses a blade that is not eccentrically mounted. Instead, the blade is mounted on a rigid shaft with a flange that is pushed by hand around the interior of the pipe, thus cutting the pipe.

U.S. Pat. No. 6,125,929 to Davis et al. discloses a down-hole casing cutting tool. Davis et al. discloses longitudinal cutting blades that are spun by rotating the drill rod of a large gas or oil drilling rig. The Davis et al. device is fairly complex and does not lend itself to simple and quick use.

In view of the above, there is a long felt but unsolved need for a down hole pipe cutting tool that avoids the above-mentioned deficiencies of the prior art and that provides an effective system that is relatively easy to use and that can be produced at a reasonable cost. Accordingly, the limitations of the prior art are addressed by the present invention discussed below.

SUMMARY OF THE INVENTION

In accordance with the present invention, a down hole pipe and casing cutter is provided. One unique feature of the invention is its ability to be utilized on an installed section of pipe that is set within a borehole, while giving the operator control over how the blade is urged into contact with the pipe wall and rotated about the circumference of the pipe to cause a complete cut. In operation, a borehole is first drilled in the earth, followed by the installation of a pipe within the borehole, such as a metal casing or a plastic well pipe. Subsequently, the invention is placed within the uppermost portion of the installed pipe that is desired to be cut, and the device is used to cut a desired length of the uppermost portion of the pipe. The device is then removed along with the cut portion of pipe.

The device is principally comprised of three main sections: (1) a lower section, (2) a middle section, and (3) an upper section. The lower section has a positioning disc and a cutting blade. The positioning disc is sized to fit the diameter of the pipe being cut. It is lowered into the pipe and is connected to the upper section by the middle section. The cutting blade is eccentrically positioned below the bottom of the positioning disc. The diameter of the cutting blade is substantially smaller than the diameter of the pipe being cut. The cutting blade can be moved between a first retracted position and a second extended cutting position. The positioning disc maintains the cutting blade position relative to the surrounding pipe wall.

The middle section may be of various lengths. Typically, a 10 foot section is used in the field for groundwater well applications; however longer lengths such as 12, 15 or 20 feet are easily used. Furthermore, the present invention has application to the plumbing industry where pipes of shorter lengths are encountered. Thus, the middle section might be only 8, 12, 24, or 36 inches long. The middle section includes a connection rod and a blade drive stem. The connection rod is simply a section of rod that connects the upper section to the lower section. The blade drive stem has an outer tubular member and an inner rod that rotates the blade.

The upper section has a positioning plate, drill linkage, and a handle to rotate the device within the pipe. The positioning plate fits over the top of the pipe, and keeps the device centered at the top of the pipe. The drill linkage allows a power source, preferably a hand drill, to be attached to the inner rod of the blade drive stem. The handle allows the entire device to be rotated within the pipe, thereby causing the entire circumference of the pipe to be cut.

In a preferred method of use, the cutting blade is first placed in its retracted (non-cutting/unexposed) position. Then the operator lowers the device into the pipe such that the lower section is positioned at the location where the pipe is desired to be cut. A hand-held power tool is mounted to the upper section and attached by the drill linkage to the inner rod of the blade drive stem. The power tool is turned "on" to spin the blade. The outer tubular member of the blade drive stem is then manually rotated by the operator using a first handle interconnected thereto, thus bringing the eccentrically mounted spinning blade into contact with the pipe wall. This rotation causes a small portion of the pipe wall circumference to be cut. While still spinning, the blade is then locked in this outer cutting position by locking the first handle in place. A second handle on the upper section is then turned by the operator through a path of 360 degrees, thereby causing the entire device to rotate within the pipe, which in turn causes the spinning blade to cut the entire circumference of the pipe. The power tool may then be turned "off." With the pipe wall now entirely cut, and without retracting the blade, the entire device is removed from the borehole. The cut section of pipe is also removed because the blade extends beyond the pipe wall, thereby supporting the pipe when removing the device from the borehole.

The above and other aspects of the invention are realized in a specific illustrated embodiment of the invention discussed below in conjunction with the drawings.

BRIEF DESCRIPTION OF THE DRAWINGS

Several drawings have been developed to assist with understanding the invention. A non-limiting embodiment of the invention will be described by way of example with reference to the accompanying drawings, in which:

FIG. 4 provides a perspective view of the upper section of the down hole pipe cutter, with a hand drill shown as the power source;

FIG. 9 provides an exploded perspective view of the down hole pipe cutter of the present invention; and, FIG. 10 is a detail drawing of a lower bushing that passes through the lower guide plate.

While the following disclosure describes the invention in connection with the embodiment presented, one should understand that the invention is not strictly limited to this embodiment. Furthermore, one should understand that the drawings are not necessarily to scale, and that in certain instances, the disclosure may not include details which are not necessary for an understanding of the present invention, such as conventional details of fabrication and assembly.

DETAILED DESCRIPTION

Figures 1, 2:
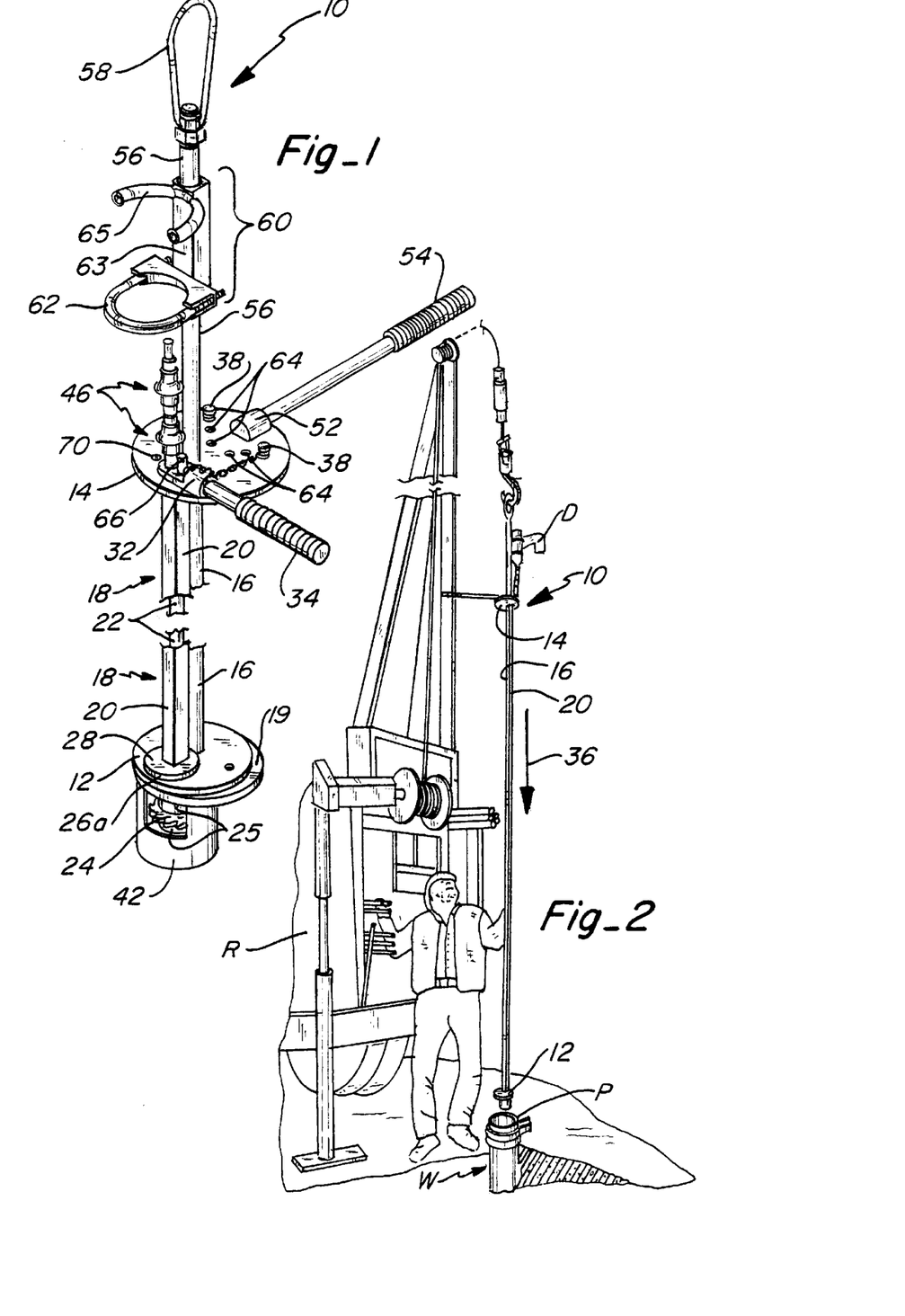
FIG. 1 provides a perspective view of the down hole pipe cutter of the present invention.
FIG. 2 provides a perspective view of the present invention suspended from a drill rig for insertion into a well pipe.

Referring initially to FIG. 1, a perspective view of a down hole pipe cutter 10 is shown. The down hole pipe cutter 10 includes a lower guide plate 12 and an upper guide plate 14, which are interconnected by a connector rod 16 and an eccentrically mounted blade drive assembly 18. Unless otherwise indicated, the various components of the down hole pipe cutter 10 are preferably made of metal or a metal alloy, such as steel.

Lower guide plate 12 has a diameter capable of being placed within the pipe or casing to be cut. More particularly, the diameter of the lower guide plate 12 is such that it may be slidably lowered into and raised out of the pipe to be cut; however, the diameter of lower guide plate 12 is such that it is in near frictional contact with the inside diameter of the pipe or casing to be cut. For example, in one preferred embodiment, lower guide plate 12 has a diameter of about 3.94 inches, thereby allowing it to be lowered into a 4.00 inch inside diameter pipe. As a further example, if the diameter of the lower guide plate 12 is approximately 1.94 inches, then it may be used in a 2.00 inch diameter pipe. The lower guide plate 12 as well as other various components of the down hole pipe cutter 10 may be proportionally adjusted, depending upon whether the pipe cutter 10 is intended for use in small, medium, or large pipes. The present invention is intended to be modified in size to accommodate pipes having various diameters.

An adjustable feature may be provided in the form of guide plates 19 which may be detachably interconnected to the lower guide plate 12, thus allowing the down hole pipe cutter 10 to be used in pipe and casing of variable size. For example, an optional guide plate 19 having a diameter of 4.44 inches may be bolted or otherwise interconnected to a lower guide plate 12 having a diameter of about 3.94 inches, thereby allowing the optional guide plate 19 to act as a guide for placement into a 4.50 inch diameter pipe or casing. Alternately, an even larger diameter optional guide plate 19 may be used, such as a 4.94 inch diameter optional guide plate 19 interconnected to a lower guide plate 12 having a diameter of about 3.94 inches, thereby allowing the down hole pipe cutter 10 to be used to cut a pipe or casing having a diameter of about 5.00 inches. In addition, larger optional guide plates 19 may be used with different size down hole pipe cutters 10 having different size diameter lower guide plates 12, such as down hole pipe cutters 10 having a 2 inch diameter lower guide plate 12 or a 10 inch diameter lower guide plate 12.

As noted above, connector rod 16 interconnects lower guide plate 12 to upper guide plate 14. The middle section of the down hole pipe cutter 10, including connector rod 16, may be manufactured in a wide variety of lengths, from just 1 to 2 inches long, as may be used in plumbing applications, to many feet long as may be used in well drilling installations. Typically, a 10 foot section is used in the field for groundwater well applications. The connector rod 16 may be welded to lower guide plate 12, as well as upper guide plate 14. However, alternate means for attaching connector rod 16 to lower guide plate 12 and upper guide plate 14 may be employed, such as by bolting or by using pins.

Now also referring to FIGS. 3,5,6,9 and 10, the eccentrically mounted blade drive assembly 18 includes an outer tube 20, a power rod or inner drive shaft 22, bushings 26a, 26b, and a blade 24. Outer tube 20 is preferably welded to bushings 26a and 26b that extend through the lower guide plate 12 and upper guide plate 14, respectively. Inner drive shaft 22 passes through the outer tube 20 and the bushings 26a, 26b. That is, inner drive shaft 22 is disposed within outer tube 20. The lower end of the inner drive shaft 22 passes through lower bushing 26a and lower guide plate 12, such that the lower end at its distal tip/end extends below the bottom of lower guide plate 12. Connected to the distal end of the inner drive shaft 22 is blade 24. The upper end of the inner drive shaft 22 passes through upper bushing 26b and upper guide plate 14, and is interconnected to a power drive linkage and/or rotating power source, as discussed in detail below. Outer tube 20 and bushings 26a and 26b can be thought of as one integral rotating member that allows the blade 24 to be placed between the first and second positions, as discussed further below. Alternatively, in lieu of incorporating bushings, the outer tube 20 could simply be one continuous member that extends between the upper and lower guide plates.

Figures 4, 9, 10:
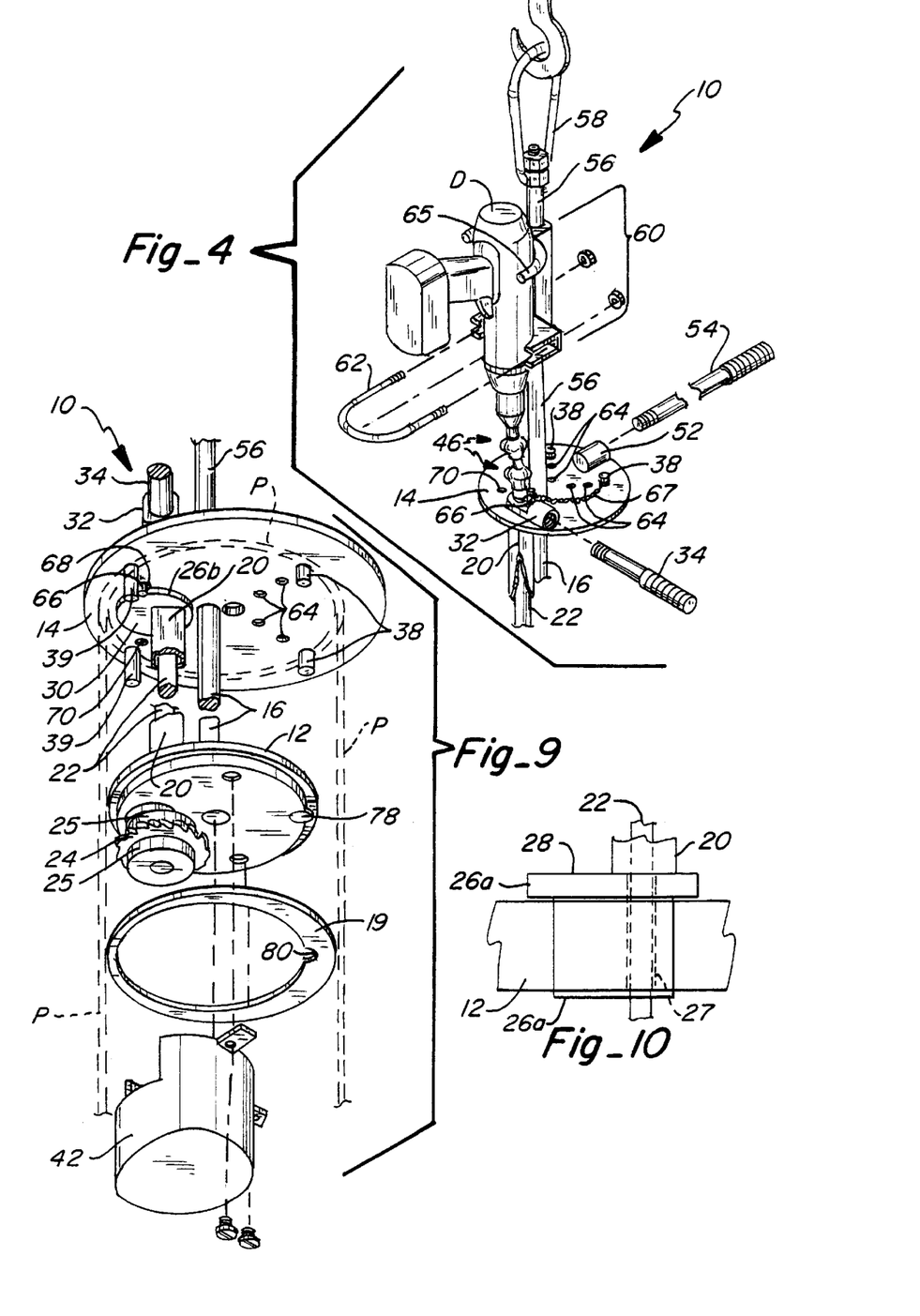

Preferably, blade 24 is mounted to the distal or lower end of the shaft 22 using a two-piece arbor assembly 25. The arbor assembly 25 is threaded to the lower end of shaft 22 and holds blade 24 between its two pieces. Use of the arbor assembly helps stabilize blade 24 while spinning, and ensures that blade 24 does not unduly bend or twist during cutting, which may otherwise result in breakage of the blade 24.

Bushings 26a, 26b pass through lower guide plate 12 and upper guide plate 14, respectively. As shown in FIG. 10, bushing 26a has an eccentric positioned aperture 27 through which the inner drive shaft 22 passes. As can be seen in FIG. 1, outer tube 20 is welded to the upper flange 28 of lower bushing 26a. Furthermore, as can be seen in FIG. 9, outer tube 20 is welded to the flange 30 of top bushing 26b. Thus, bushing 26b is inverted in comparison to bushing 26a. Outer tube 20 is welded to bushings 26a, 26b in an eccentric manner because outer tube 20 surrounds inner drive shaft 22 that passes through the eccentrically located apertures passing through the bushings.

Handle mount 32 connects to the upper portion of upper bushing 26b that extends through the upper guide plate 14. Handle mount 32 may be connected to bushing 26b using threaded screws or bolts (not shown) that pass through handle mount 32 and into threaded openings (not shown) on bushing 26b. A handle 34 extends from the handle mount 32. Handle 34 may connect to mount 32 as by threads, bolts, or other well known means.

Referring back to FIG. 2, the down hole pipe cutter 10 is shown suspended from a drill rig R over a well W. A pipe P has been lowered into the borehole of the well W. As can be seen from FIG. 2, connector rod 16 and outer tube 20 may be of considerable length, thereby allowing pipe P to be cut at some depth within well W. The down hole pipe cutter 10 is prepared to be lowered into well W in accordance with the direction of arrow 36.

Figure 3:
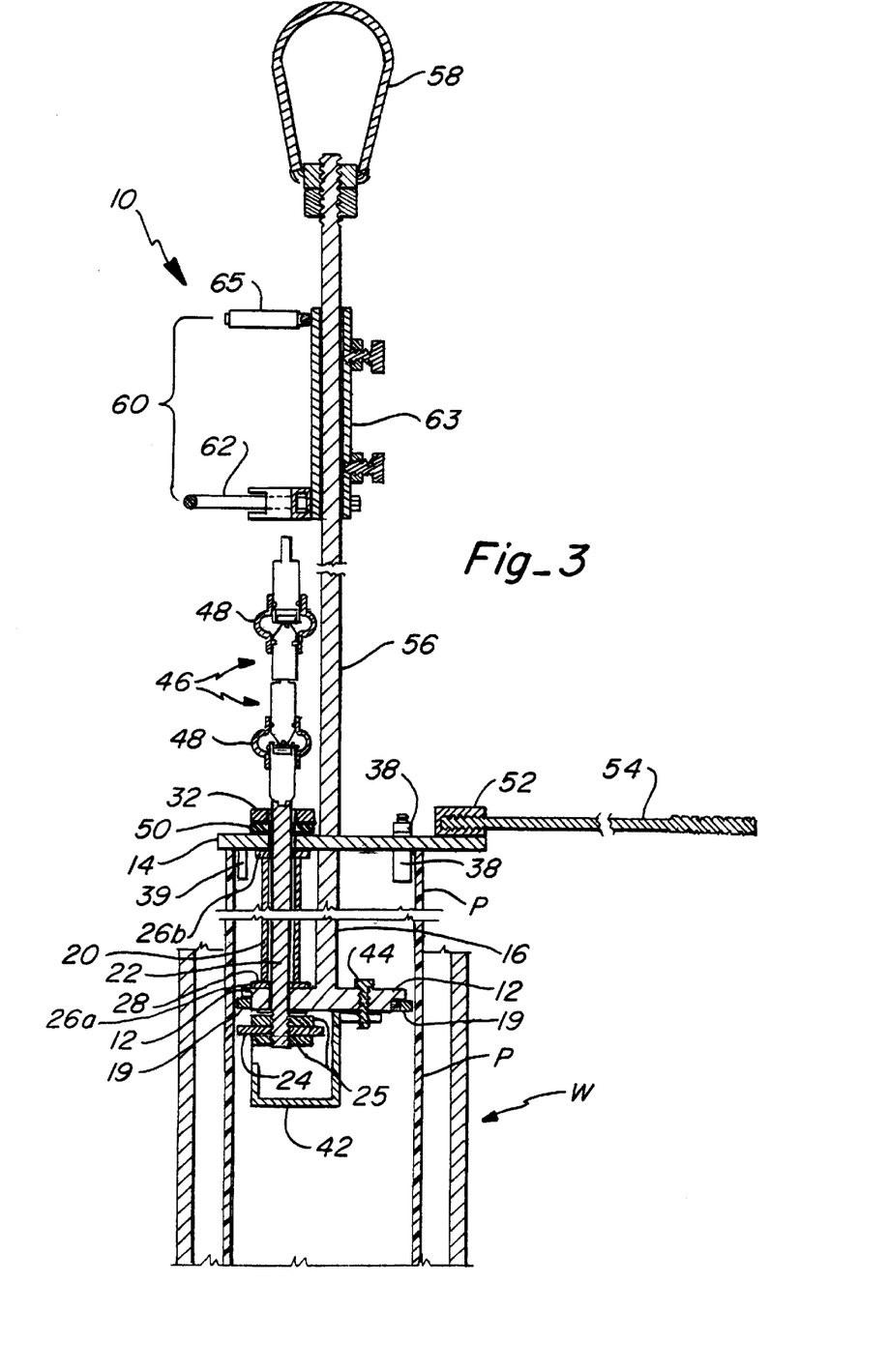
FIG. 3 provides a side cross-sectional view of the present invention inserted into a pipe within a well casing.

Now referring to FIG. 3, a cross-sectional view of down hole pipe cutter 10 of the present invention is shown positioned within well W such that lower guide plate 12 is within pipe P and upper guide plate 14 is resting on the top of pipe P. Upper guide plate 14 is positioned over pipe P by aligning adjustable guide posts 38 and permanent guide posts 39 within the interior surface of the pipe P. Each adjustable guide post 38 may be detachably connected to upper guide plate 14 using a nut or some other piece of hardware. As best seen in FIG. 4, a plurality of spaced holes 64 are formed on upper guide plate 14. The plurality of spaced holes 64 provide the operator the ability to adjust the location of adjustable guide posts 38 for using down hole pipe cutter 10 on larger or smaller size diameter pipe P. Accordingly, spaced holes 64 are positioned to match the locations necessary for near frictional insertion of adjustable guide posts 38 and permanent guide posts 39 into the upper end of a pipe P.

Still referring to FIG. 3, a cuttings collector 42 may be positioned below blade 24 to catch cuttings which would otherwise fall within the interior of the pipe. Bolts 44 may be used to detachably interconnect optional guide plate 19, and cuttings collector 42, to lower guide plate 12.

Still referring to FIG. 3, two universal joints 46 may be used to interconnect the proximal end of the inner drive shaft 22 to the power tool which spins the shaft. Preferably, universal joints 46 include a protective rubber boot 48 to reduce the infiltration of dirt or other contaminants into the universal joints 46. Although two joints 46 are shown, only one joint could be used. The advantage of two joints is that they provides additional flexibility to compensate for misalignment between the power tool and shaft 22.

Between the handle mount 32 and upper guide plate 14, a vibration damper 50 may be used to reduce vibrations caused by the spinning inner drive shaft 22. Vibration damper 50 may be a hardened felt washer, although other types of vibration damping materials may be used for this purpose, such as leather, rubber, or plastic. The damper 50 preferably surrounds the periphery of the upper portion of bushing 26b that extends above plate 14.

FIG. 3 also depicts a second handle mount 52 that is also mounted to the upper guide plate 14. Second handle mount 52 receives a handle 54. Handle 54 is used to rotate down hole pipe cutter 10 about the circumference of pipe P, thereby allowing a continuous cut to be made around the circumference of the pipe P.

FIG. 3 also illustrates lifting rod 56 that mounts to the upper guide plate 14, and is used to raise or lower down hole pipe cutter 10 within the pipe P. Down hole pipe cutter 10 may also include a lifting hook 58 attached to the top-most end of lifting rod 56. A power tool may be mounted to rod 56 as by bracket assembly 60. Assembly 60 may include clamp 63 and corresponding U-bolts 62.

FIG. 4 shows hand drill D mounted to bracket 60. Cradle 65 may also be used to support the drill D.

Figures 5, 6:
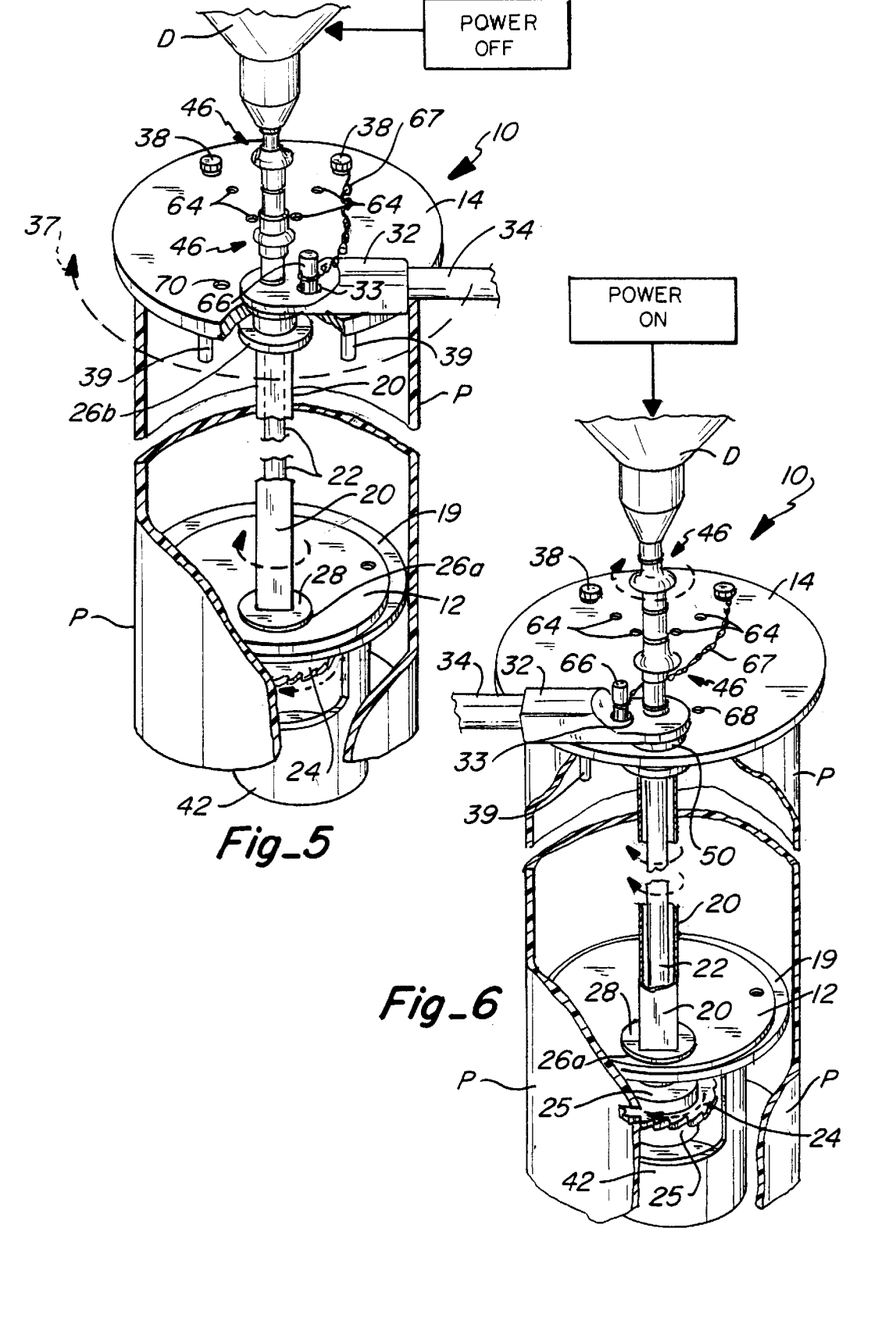
FIG. 5 provides a cut-away perspective view of the down hole pipe cutter inserted into a section of pipe with the eccentrically mounted blade in its first retracted position where it is set prior to urging the blade into contact with the pipe wall.
FIG. 6 provides the same view as that shown in FIG. 5, but with the eccentrically mounted blade having been moved to its second extended cutting position, such that the blade contacts a portion of the pipe wall.

The series of FIGS. 5–8 illustrate use of the down hole pipe cutter 10, and will be discussed in order. First, FIG. 5 illustrates the position of the various components of the down hole pipe cutter 10 after the it has been lowered into a section of pipe P. Here, blade 24 is shown in its retracted position such that the eccentrically mounted blade 24 does not protrude to touch the pipe P. Handle mount 32 may be held in the retracted position by locking pin 66 disposed through handle pin hole 33 and first locking hole 68 that penetrates upper guide plate 14. Locking pin 66 may be secured to nut 40 for safe keeping using chain 67. With the blade 24 in its retracted position, down hole pipe cutter 10 is then engaged to spin power rod or inner drive shaft 22 by application of a power source, such as drill D, to the top of the inner drive shaft 22 using drill linkage, such as the universal joints 46. Although shown as a hand drill D, the inner drive shaft 22 may be powered by other appropriately configured power sources, such as other hand power tools or even trailer mounted power tools.

Following engagement of drill D to spin inner drive shaft 22, the eccentrically mounted blade drive assembly 18 is rotated from its first retraced position to its second extended cutting position by rotating handle 34 along arrow 37 from the position shown in FIG. 5 to the position shown in FIG. 6. Locking pin 66 is removed from the first locking pin hole 68 to allow rotation of handle 34 from the position shown in FIG. 5 to the position shown in FIG. 6. Thereafter, locking pin 66 may be inserted through pin hole 33 in handle mount 32 and into second locking pin hole 70 in upper guide plate 14 to secure the drive assembly in the second extended cutting position. As handle 34 is moved to its second position, the outer tube 20 and bushings 26a, 26b are rotated to bring blade 24 in contact with pipe P, thereby causing blade 24 to cut a portion of the pipe wall.

Figures 7, 8:
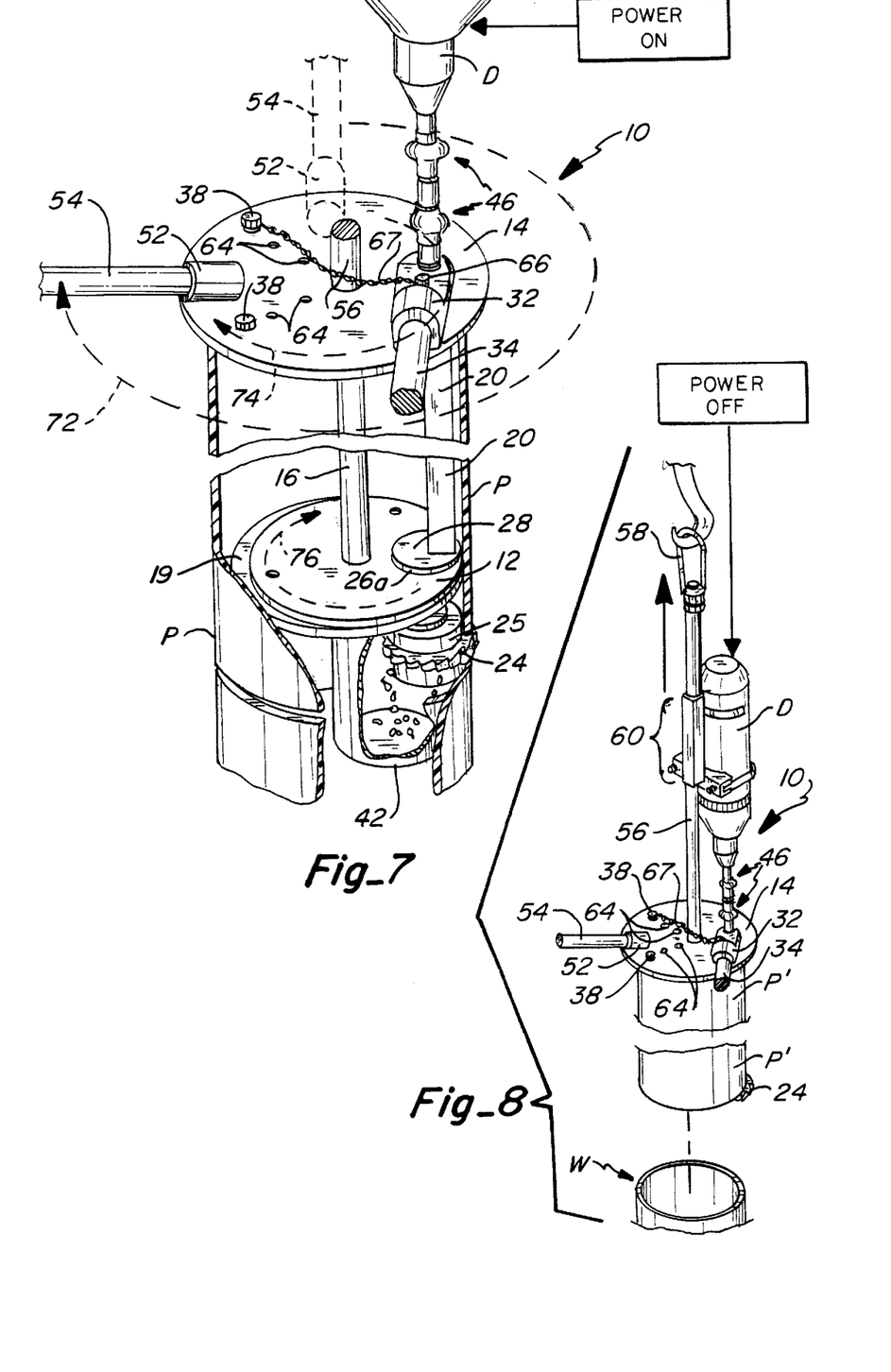
FIG. 7 again provides the same view as that shown in FIGS. 5 and 6, but with the down hole pipe cutter having been rotated approximately 270 degrees around the circumference of the pipe, such that three-fourths of the pipe wall is cut.
FIG. 8 shows a perspective view of a severed section of pipe being extracted from a well together with the down hole pipe cutter.

Now referring to FIG. 7, after the blade 24 is urged into contact with pipe P and is locked in its extended cutting position, second handle 54 is rotated by the operator to cause the down hole pipe cutter 10 to rotate about the circumference of the pipe P. This action causes blade 24 to cut the entire circumference of pipe P. As shown in FIG. 7, handle 54 moves from its first position shown in phantom lines to its second position shown in solid lines, and finally back to its original position shown in phantom lines, thereby completing 360 degrees of rotation and also completing the cut of the circumference of pipe P. As shown in FIG. 7, dashed arrow 72 shows the path of handle 54 from its first position to its temporary second position after having traversed about 270 degrees of rotation. Also shown in FIG. 7 is dashed arrow 74 that shows the corresponding rotation of upper guide plate 14. In addition, arrow 76 shows the rotation of lower guide plate 12. Thus, upon rotation of handle 54, the entire down hole pipe cutter 10 is turned in pipe P. FIG. 7 also illustrates the collection of cuttings in cutting collector 42 located proximate blade 24.

Referring now to FIG. 8, the severed portion of pipe P' is shown being removed from well W by lifting the down hole pipe cutter 10 with the blade in its second extended cutting position. More particularly, after handle 54 is rotated about the circumference of pipe P, the power source may be turned off. Without moving handle 34 from its locked extended cutting position, the blade 24 protrudes beyond the pipe wall, thereby supporting severed pipe P' and allowing it to be removed together with the down hole pipe cutter 10.

Referring now to FIG. 9, it illustrates the eccentric position of outer tube 20 in relation to the upper bushing 26b. This eccentric arrangement allows the blade drive assembly 18 to be inserted into pipe P in a first retracted position and then moved to a second extended cutting position by rotating handle 34, such that bushings 26a and 26b rotate together with outer tube 20 and inner drive shaft 22 to bring blade 24 into contact with pipe P. FIG. 9 also clearly illustrates the plurality of spaced holes 64 located within upper guide plate 14, which are available to receive adjustable guide posts 38 to adjust the position of posts 38 such that they accommodate different size pipe diameter. FIG. 9 also illustrates the configuration of lower guide plate 12 and the optional usage of guide plate 19 which may be attached to a lower guide plate 12 to allow for the down hole pipe cutter 10 to be used inside pipe P that have a larger diameter size than the lower guide plate 12. FIG. 9 also illustrates the location of indexing pin 78 on lower guide plate 12. Indexing pin 78 is aligned with notch 80 on guide plate 19 to ensure plate 19 and plate 12 are thus aligned with respect to one another. Indexing pin 78 allows guide plate 19 to be aligned with lower guide plate 12.

By the foregoing, a down hole pipe and casing cutter is provided that allows efficient and reliable cutting of pipe at any length of an installed pipe. This is achieved through the use of an eccentric blade drive assembly that is urged into contact with the pipe wall by the operator. The operator then proceeds to rotate the device within the pipe to complete the cut around the circumference of the pipe. The severed section of pipe is then removed from the borehole together with the cutting device.

While various aspects of the present invention have been described in detail, it is apparent that modifications and adaptations of those aspects will occur to those skilled in the art. However, it is to be expressly understood that such modifications and adaptations are within the spirit and scope of the present invention.

What is claimed is:

1. A device for cutting a pipe, comprising:
   a lower guide plate and an upper guide plate;
   a connector rod interconnecting said lower guide plate to said upper guide plate;
   an eccentrically mounted blade drive assembly including an outer tube and an inner drive shaft, said outer tube moveably mounted between said lower guide plate and said upper guide plate, said inner drive shaft disposed within said outer tube and independently rotatable within said outer tube, said inner drive shaft having a distal end extending through said lower guide plate and a proximal end extending above said upper guide plate, said blade drive assembly further including a blade mounted to said distal end of said inner drive shaft, wherein said blade drive assembly is movable between a first retracted position and a second extended cutting position;
   a handle connected to said blade drive assembly to rotate said blade drive assembly from said first retracted position to said second extended cutting position;
   means attached to said proximal end of said inner drive shaft to selectively spin said inner drive shaft.

2. The device as claimed in claim 1 further comprising means mounted to said upper guide plate for locking said blade drive assembly in said second extended cutting position.

3. The device as claimed in claim 1 wherein said means for rotating said inner drive shaft comprises a hand drill.

4. The device as claimed in claim 1 further comprising at least one universal joint interconnecting said proximal end of said inner drive shaft to said means for spinning.

5. The device as claimed in claim 1 further comprising a cuttings collector positioned below the blade to catch cuttings created during cutting.

6. The device as claimed in claim 1 further comprising a lifting hook interconnected to said upper guide plate.

7. The device as claimed in claim 1 wherein said outer tube is greater than about 9 feet long.

8. The device as claimed in claim 1 further comprising a vibration damper mounted adjacent the upper guide plate.

9. The device as claimed in claim 1 further comprising a plurality of arcuately spaced holes formed in said upper guide plate, and at least one guide post mounted in one hole of said plurality of holes.

10. The device as claimed in claim 1 further comprising a guide plate detachably connected to said lower guide plate.

11. A device for cutting a pipe within a borehole, the pipe having a pipe wall and a circumference, the device comprising:
- a lower guide plate having a diameter sized to fit inside the pipe;
- an upper guide plate;
- a connector rod interconnecting said lower guide plate to said upper guide plate;
- an outer member extending between said lower guide plate and said upper guide plate, said outer member being rotatable between a first retracted position and a second extended cutting position; a power rod disposed inside said outer member and having an upper end extending through said upper guide plate and a lower end extending through said lower guide plate;
- a blade mounted to said lower end of said power rod;
- means for spinning said power rod attached at said upper end of said power rod;
- a first handle connected to said outer member to rotate said outer member from said first retracted position to said second extended cutting position thereby positioning said blade to extend radially beyond the pipe wall of the pipe; and
- means mounted to said device for rotating said device about the circumference of the pipe thereby allowing said blade to cut a selected distance along the circumference of the pipe.

12. The device as claimed in claim 11 further comprising means mounted to said upper guide plate for locking said outer member in said second cutting position.

13. The device as claimed in claim 12 wherein said means for locking comprises a locking pin and a pin hole formed in said upper guide plate.

14. The device as claimed in claim 11 wherein said means for rotating said device includes a second handle interconnected to said upper guide plate.

15. The device as claimed in claim 11 wherein said means for spinning said power rod comprises a hand drill.

16. The device as claimed in claim 11 further comprising at least one universal joint interconnecting said upper end of said power rod to said means for spinning.

17. The device as claimed in claim 11 wherein said lower guide plate includes an indexing pin positioned on a periphery thereof.

18. The device as claimed in claim 11 further comprising a cuttings collector attached to said lower guide plate.

19. The device as claimed in claim 11 further comprising a lifting hook attached to said upper guide plate.

20. The device as claimed in claim 11 wherein said outer member is greater than about 9 feet long.

21. The device as claimed in claim 11 further comprising a vibration damper operatively associated with said first handle.

22. The device as claimed in claim 11 further comprising a plurality of spaced holes formed within said upper guide plate for accepting guide posts therein.

23. The device as claimed in claim 11 further comprising a guide plate detachably mounted to said lower guide plate.

24. A method of cutting a pipe from the pipe's interior and removing the pipe from a borehole, the pipe having a pipe wall and a circumference, the method comprising:
- placing at least a portion of a pipe cutting tool within the interior of the pipe, the tool including an eccentrically mounted blade drive assembly having a blade movable from a retracted position to an extended cutting position;
- engaging the pipe cutting tool to spin the blade; urging the blade drive assembly from the retracted position to the extended cutting position, wherein the blade penetrates the pipe wall of the pipe;
- rotating the tool about the circumference of the pipe to cut the pipe wall about the circumference of the pipe; and
- removing the severed pipe section from the borehole by lifting the tool from the borehole.

25. A device for cutting a pipe, comprising:
- a lower guide plate and an upper guide plate;
- a connector rod interconnecting said lower guide plate to said upper guide plate;
- an eccentrically mounted blade drive assembly including a blade mounted to a lower end of said blade drive assembly, wherein said blade drive assembly is movable between a first retracted position and a second extended cutting position;
- a first handle connected to said blade drive assembly to rotate said blade drive assembly from said first retracted position to said second extended cutting position;
- means attached to said blade drive assembly to selectively spin said blade; and
- means mounted to said device for rotating said device about the circumference of the pipe, thereby allowing said blade drive assembly to cut a selected distance along the circumference of the pipe.

26. The device as claimed in claim 25 further comprising means mounted to said upper guide plate for locking said blade drive assembly in said second extended cutting position.

27. The device as claimed in claim 26 wherein said means for locking comprises a locking pin and a pin hole formed in said upper guide plate.

28. The device as claimed in claim 25 wherein said means for rotating said device includes a second handle interconnected to said upper guide plate.

29. The device as claimed in claim 25 wherein said means for spinning said blade comprises a hand drill.

30. The device as claimed in claim 25 further comprising at least one universal joint interconnecting said upper end of said blade drive assembly to said means for spinning.

31. The device as claimed in claim 25 wherein said lower guide plate includes an indexing pin positioned on a periphery thereof.

32. The device as claimed in claim 25 further comprising a cuttings collector attached to said lower guide plate.

33. The device as claimed in claim 25 further comprising a lifting hook attached to said upper guide plate.

34. The device as claimed in claim 25 wherein said connector rod is greater than about 9 feet long.

35. The device as claimed in claim 25 further comprising a vibration damper operatively associated with said first handle.

36. The device as claimed in claim 25 further comprising a plurality of spaced holes formed within said upper guide plate for accepting guide posts therein.

37. The device as claimed in claim 25 further comprising a guide plate detachably mounted to said lower guide plate.

38. A device for cutting a pipe, comprising:
- a lower guide plate and an upper guide plate;
- a connector rod interconnecting said lower guide plate to said upper guide plate;

an eccentrically mounted blade drive assembly including an outer tube and an inner drive shaft, said blade drive assembly further including a blade mounted to a distal end of said inner drive shaft, wherein said blade drive assembly is movable between a first retracted position and a second extended cutting position;

means for moving said blade drive assembly from said first retracted position to said second extended cutting position;

means attached to said proximal end of said inner drive shaft to selectively spin said inner drive shaft.

39. The device as claimed in claim 38, wherein said outer tube is moveably mounted between said lower guide plate and said upper guide plate.

40. The device as claimed in claim 38, wherein said inner drive shaft is disposed within said outer tube, and wherein said inner drive shaft is independently rotatable within said outer tube.

41. The device as claimed in claim 38, wherein said distal end of said inner drive shaft extends through said lower guide plate and a proximal end of said inner drive shaft extends above said upper plate.

42. The device as claimed in claim 38, wherein said means for moving comprises a handle connected to said blade drive assembly.

43. A device for cutting a pipe, comprising:

a lower guide plate and an upper guide plate;

a connector rod interconnecting said lower guide plate to said upper guide plate;

an eccentrically mounted blade wherein said blade is movable between a first retracted position and a second extended cutting position;

means for moving said blade from said first retracted position to said second extended cutting position;

means attached to said blade to selectively spin said blade; and means mounted to said device for rotating said device about the circumference of the pipe.

44. The device as claimed in claim herein said means for moving said blade from said first retracted position to said second extended position comprises a handle connected to said blade drive assembly.

45. A method of cutting a pipe from the pipe's interior, the pipe having a pipe wall and a circumference, the method comprising:

placing at least a portion of a pipe cutting tool within the interior of the pipe, the inserted portion including an upper guide plate and a lower guide plate, the tool further including an eccentrically mounted blade drive assembly having a blade connected to an inner drive shaft, the inner drive shaft at least partially within an outer tube, the blade movable from a retracted position to an extended cutting position;

engaging the pipe cutting tool to spin the inner drive shaft and the blade;

urging the blade drive assembly from the retracted position to the extended cutting position, wherein the blade penetrates the pipe wall of the pipe; and rotating the tool about the circumference of the pipe to cut the pipe wall about the circumference of the pipe.

46. The method as claimed in claim 45, further comprising the step of removing the severed pipe section from a borehole by lifting the tool from the borehole.

* * * * *

UNITED STATES PATENT AND TRADEMARK OFFICE
CERTIFICATE OF CORRECTION

PATENT NO. : 6,626,074 B1  
DATED : September 30, 2003  
INVENTOR(S) : Wheeler

It is certified that error appears in the above-identified patent and that said Letters Patent is hereby corrected as shown below:

Column 9,
Line 16, please start a new paragraph with "a power rod disposed..."

Column 10,
Line 4, please start a new paragraph with "urging the..."

Column 12,
Line 7, please delete "claim herein" and insert -- claim 43, wherein --.

Signed and Sealed this

Thirteenth Day of April, 2004

JON W. DUDAS
*Acting Director of the United States Patent and Trademark Office*